United States Patent
Tantalo et al.

(10) Patent No.: US 8,648,873 B1
(45) Date of Patent: Feb. 11, 2014

(54) SPATIALLY VARIANT DYNAMIC RANGE ADJUSTMENT FOR STILL FRAMES AND VIDEOS

(75) Inventors: Theodore Anthony Tantalo, Rochester, NY (US); Kenneth Michael Brodeur, Webster, NY (US)

(73) Assignee: Exelis, Inc., McLean, VA (US)

( * ) Notice: Subject to any disclaimer, the term of this patent is extended or adjusted under 35 U.S.C. 154(b) by 588 days.

(21) Appl. No.: 12/949,969

(22) Filed: Nov. 19, 2010

(51) Int. Cl.
*G09G 5/00* (2006.01)
*G09G 5/02* (2006.01)
*H04N 5/14* (2006.01)
*G06K 9/34* (2006.01)
*G06K 9/40* (2006.01)
*G06K 9/36* (2006.01)
*G06K 9/54* (2006.01)
*G06F 7/00* (2006.01)
*G06F 17/10* (2006.01)
*G06F 7/38* (2006.01)
*G06G 7/02* (2006.01)

(52) U.S. Cl.
USPC .......... 345/589; 345/606; 345/617; 345/619; 345/698; 348/672; 382/171; 382/260; 382/274; 382/276; 382/307; 708/201; 708/207; 708/300; 708/490; 708/819

(58) Field of Classification Search
USPC ............. 345/581, 589, 606, 617–619, 629, 345/634–635, 643, 501, 204, 690, 698; 348/169, 177, 207, 236, 254, 552, 571; 348/241, 255; 358/1.9, 448; 382/168, 171, 382/173, 232, 254, 260, 268, 272, 274, 276, 382/300, 305, 307, 312; 708/100, 200–203, 708/207, 290, 300, 313–315, 445, 490, 708/804–805, 819, 847
See application file for complete search history.

(56) References Cited

U.S. PATENT DOCUMENTS

| | | | | |
|---|---|---|---|---|
| 5,778,044 A * | 7/1998 | Bruijns | ........................ | 378/98.7 |
| 5,909,244 A * | 6/1999 | Waxman et al. | ............ | 348/222.1 |
| 6,686,970 B1 * | 2/2004 | Windle | ......................... | 348/584 |
| 6,728,416 B1 * | 4/2004 | Gallagher | ..................... | 382/265 |
| 7,071,947 B1 * | 7/2006 | Papakipos et al. | ............ | 345/581 |
| 2002/0168094 A1 * | 11/2002 | Kaushikkar et al. | .......... | 382/128 |
| 2003/0052979 A1 * | 3/2003 | Soga et al. | .................... | 348/241 |
| 2003/0090455 A1 * | 5/2003 | Daly | ............................. | 345/102 |
| 2003/0228064 A1 * | 12/2003 | Gindele et al. | ................ | 382/260 |
| 2006/0110022 A1 * | 5/2006 | Zhang et al. | .................. | 382/132 |
| 2009/0245661 A1 * | 10/2009 | Ilbery | ........................... | 382/233 |
| 2009/0274389 A1 * | 11/2009 | Yamamoto | .................... | 382/274 |
| 2009/0297023 A1 * | 12/2009 | Lipton et al. | .................. | 382/164 |
| 2010/0069755 A1 * | 3/2010 | Nishimura et al. | ........... | 600/443 |

OTHER PUBLICATIONS

Gonzalez, Rafael C. et al., "Digital Image Processing," Prentice Hall, New Jersey, pp. 598-600, 2002.

* cited by examiner

*Primary Examiner* — Xiao Ke
*Assistant Examiner* — Wesner Sajous
(74) *Attorney, Agent, or Firm* — RatnerPrestia

(57) ABSTRACT

A system including a processor for adjusting the dynamic range of an image including a plurality of pixels. The processor segments the pixels into blocks, and computes statistical values for each block based on intensity values of the pixels. The processor also adjusts the dynamic range of the image by controlling the intensity values of the pixels based on the statistical values.

17 Claims, 7 Drawing Sheets

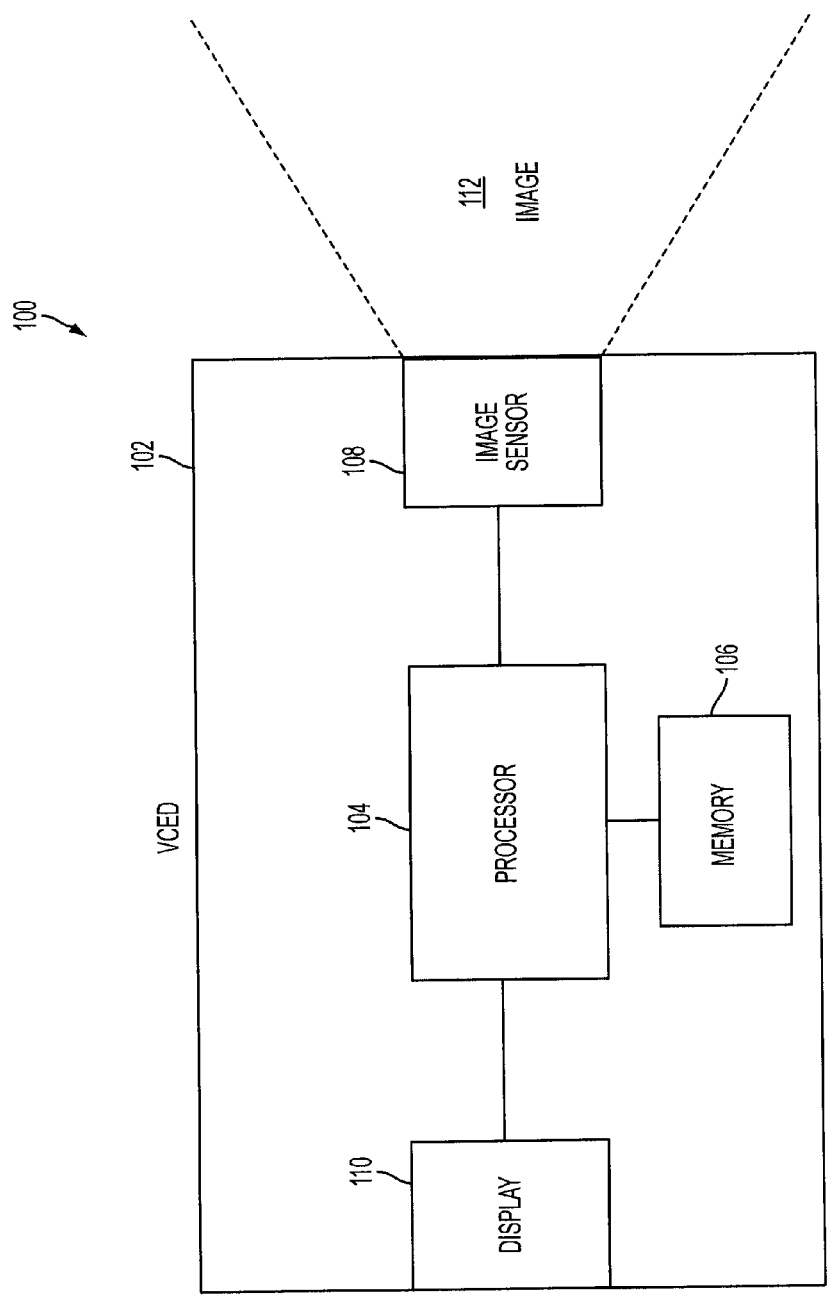

SPATIALLY VARIANT DYNAMIC RANGE ADJUSTMENT FOR STILL FRAMES AND VIDEOS

The present invention relates, in general, to a system and method for performing spatially variant dynamic range adjustment (SVDRA) to enhance the contrast of an image or video sequence. Specifically, the system utilizes local block statistics in order to perform SVDRA.

BACKGROUND

In conventional systems, contrast enhancement for still pictures and video sequences is generally broken into two categories: global based enhancement and local based enhancement. An image histogram (showing distribution of pixel intensity values) is the primary tool to determine how input pixels are mapped to output pixels when performing contrast enhancement.

In some global based systems, a processor computes a histogram of the entire image utilizing the entire data set (all of the pixels in the image). Based on this cumulative histogram of the image, the system determines gain and offset of each pixel in order to perform dynamic range adjustment.

In some local based systems, the image is segmented into smaller blocks within the image where each block includes a computed local histogram. The adjusted value of each pixel in each block is then determined based on the histogram of the respective block.

In general, global systems compute histograms of an entire image data set which may be negatively influenced by dominant objects such as sky, water, foreground grass, etc. This often results in a less than desirable appearance which lacks noticeable distinction between grey levels. In contrast, local systems tend to produce better results than the global systems. However, computing and manipulating multiple histograms (for many blocks within an image) may pose problems to systems having limited processing and/or storage capabilities.

SUMMARY

To meet this and other needs, and in view of its purposes, the present invention provides a system for adjusting dynamic range of an image which includes a plurality of pixels. The system includes a processor configured to segment the pixels into blocks, and compute statistical values for each block based on intensity values of the pixels in each blocks. The processor adjusts the dynamic range of the image by controlling the intensity values of the pixels based on the statistical values.

The system may also include an image sensor for capturing the image, and a display for displaying an adjusted image. In one example, the processor, image sensor and display are included in a Video Capture and Enhancement system (VCED) controlled by a user.

In one example, the processor is configured to exclude pixel values in each block before computing the statistical values. The processor computes a minimum pixel value, a maximum pixel value, a mean pixel value and a mean of absolute differences (MAD) value, per each block, as the statistical values. The processor is also configured to compute for each block, a gain value based on the mean pixel value and MAD value of the respective block, and an offset value based on the mean pixel value of the respective block. The processor then adjusts the dynamic range of the image by applying a respective gain value and a respective offset value to each pixel in each block.

In one example, the processor is configured to segment the pixels into blocks that overlap each other, or blocks that do not overlap each other. The processor is also configured to adjust the gain value and offset value applied to each pixel by weighting the gain value and offset value based on a distance between each pixel and a reference location in the pixel block to which each pixel belongs and reference locations in adjacent pixel blocks.

In another example, the processor configured to segment the pixels into blocks, compute a gain and an offset value for each block in an image based on intensity values of the pixels in each block and filter the gain and offset values for the blocks based on a previous gain and offset values for the block in a previous image. The processor then adjusts the dynamic range of the image by controlling the intensity values of the pixels based on the filtered pixel gain and offset.

Included are an image sensor for capturing real time video, and a display for displaying an adjusted real time video. In one example, the processor, image sensor and display are included in a vehicle.

The processor is configured to compute the gain and offset values for each block in each image based on statistical values such as a minimum pixel value, maximum pixel value, mean pixel value and mean of absolute differences (MAD) value. The processor is also configured to filter the gain and offset values by an infinite impulse response (IIR) filter that computes a weighted sum between the gain and offset values of a block in the image and the previous gain and offset values of the block in the previous image in the sequence.

The processor is configured to adjust the gain value and offset value by weighting the gain value and offset value based on a distance between each pixel and a reference location in the pixel block to which each pixel belongs and reference locations in adjacent pixel blocks. The processor is configured to select three adjacent blocks when the pixel is located between the centers of four blocks, and select one adjacent block when the pixel is located between the centers of two blocks and a border of the image.

In one example, the processor is configured to convolve the statistical values of each block with a normalized convolution kernel to reduce a difference between statistical values in adjacent blocks, and to overlap the blocks in the image to correlate the statistical values between adjacent blocks.

A method for adjusting dynamic range of an image including a plurality of pixels, includes segmenting the pixels into blocks, and computing statistical values for each block based on intensity values of the pixels in each block. The method also includes adjusting the dynamic range of the image by controlling the intensity values of the pixels based on the statistical values.

The method may also include capturing the image, displaying the adjusted image, and identifying an object of interest in the adjusted image. In one example the method includes computing, for each block, a minimum pixel value, maximum pixel value, mean pixel value, where the pixel values below and above an intensity threshold are excluded prior to computing the minimum, maximum and mean values.

The method may also include computing a mean of absolute differences (MAD) value, where the pixel values below the threshold are set to the minimum value and the pixel values above the threshold are set to the maximum pixel value prior to computing the MAD, and where the minimum, maximum and MAD values are the statistical values.

The method may also include computing a gain value based on the mean pixel value and MAD value of the respective block, computing an offset value based on the mean pixel value of the respective block, and adjusting the dynamic range of the image by applying the respective gain value and respective offset value to each pixel in each block.

The method may also include adjusting the gain value and offset value applied to each pixel by weighting the gain value and offset value based on a distance between each pixel and a reference location in the pixel block to which each pixel belongs and adjacent pixel blocks.

It is understood that the foregoing general description and following detailed description are exemplary, but are not restrictive, of the invention.

BRIEF DESCRIPTION OF THE FIGURES

FIG. 1 is a view of a Video Capture Enhancement and Display (VCED) system for performing SVDRA, according to an embodiment of the present invention.

DETAILED DESCRIPTION

Figure 2A:
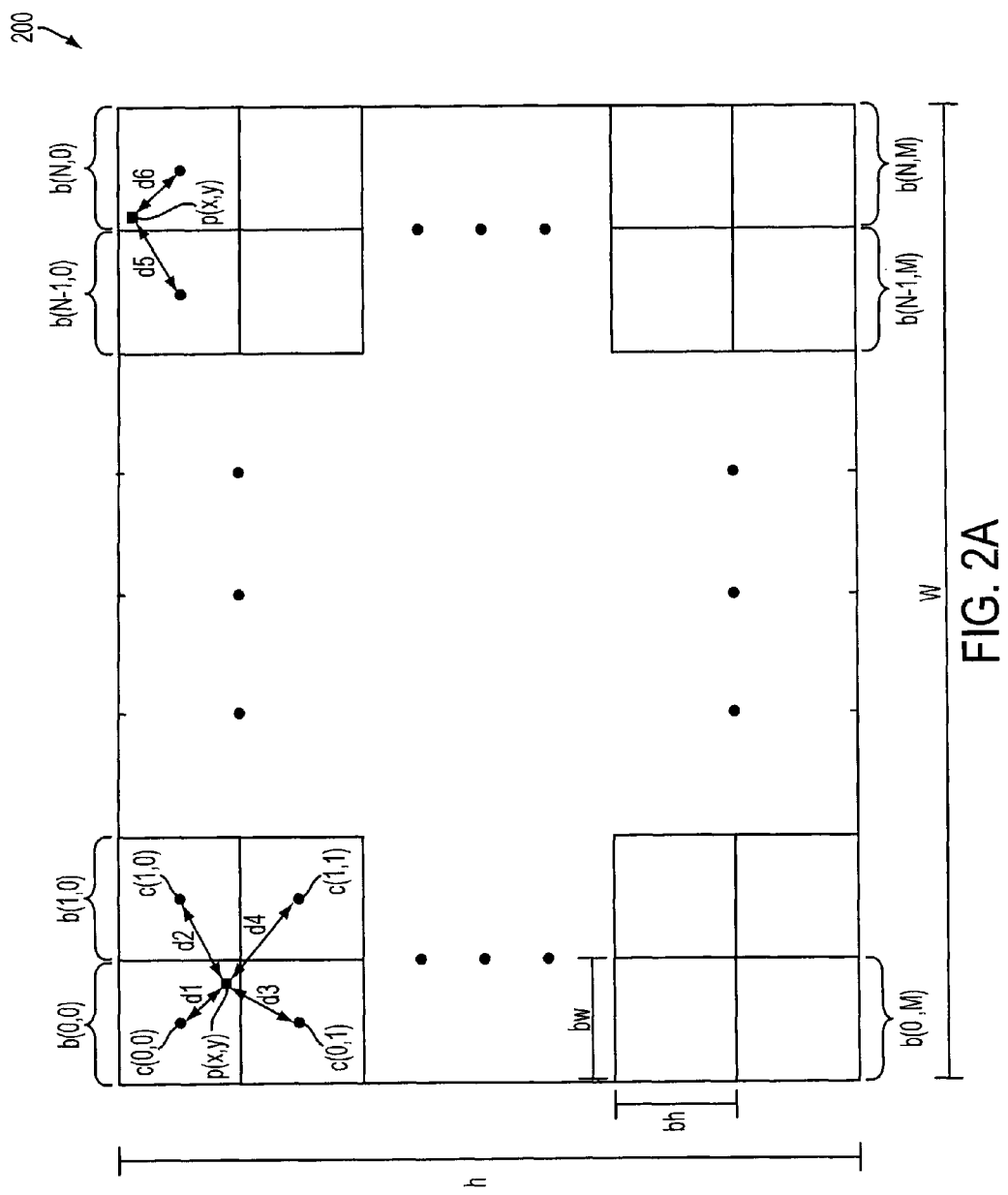
FIG. 2a is a view of an image which is segmented into a plurality of pixel blocks for performing SVDRA, according to an embodiment of the present invention.

As will be described, the present invention provides a spatially variant dynamic range adjustment (SVDRA) system configured to perform contrast enhancement (i.e. adjust intensity values of pixels) based on statistics within an image. The system provides the ability to segment an image into a plurality of pixel blocks. Statistics (not a histogram) for each pixel block are then computed. A gain and an offset (i.e. pixel-wise remapping parameters) for performing dynamic range adjustment are then computed based on the statistics of each pixel block.

In one embodiment a Video Capture Enhancement and Display (VCED) system 102 (e.g. an imaging system mounted to a vehicle, etc.) may be capturing a real time video of a scene (e.g. a battlefield). For example, image sensor 108 (e.g. Frame Array Digital Image Sensor, thermal/intensity sensor, etc. . . . ) may be capturing an image 112 of the scene which may have low contrast due to dominant background artifacts (e.g. foliage). Processor 104 (utilizing memory 106) may perform SVDRA in order to enhance contrast of image 112. An enhanced contrast image may then be displayed (by display 110), allowing the observer (e.g. soldier) to visually interpret the structure of objects of interest (e.g. vehicles, persons, structures) within the image. Although FIG. 1 shows a system implementing SVDRA in an VCED system, it is noted that SVDRA of the present invention may be implemented on any image or video that is either captured by an image sensor in real time or pre-stored in a database memory (i.e. a pre-stored image may be extracted from a database and processed to adjust its dynamic range).

For example, a visual light, laser, thermal, radio frequency, or any other type of image sensor may be utilized to capture an image of interest. The sensor may be implemented on an VCED system worn by a user (e.g. police officer), or mounted to a vehicle (e.g. police car, jeep, aircraft, etc.). Regardless of how the image is captured, processor 104 (e.g., a microprocessor, field programmable gate array (FPGA), application specific integrated circuit (ASIC), etc. . . . ) may be utilized to perform the SVDRA algorithm described by the present invention. In either embodiments, the present invention enhances an image to allow an observer to visually interpret and distinguish objects within the image.

Rather than computing histograms for each pixel block in image 112 (i.e. as in conventional local based systems), the SVDRA system of the present invention computes descriptive statistics on a block by block basis. The descriptive statistics from each block within the image are utilized to compute a pixel dependent linear stretch (i.e. adjust the pixel intensity values).

Shown in FIG. 2a is an image 200 which includes a plurality of pixels (e.g., 1000×1000 pixels). In the SVDRA algorithm, the image is segmented into smaller pixel blocks b(i,j). As shown in FIG. 2a, image 200 is broken into M rows×N columns pixel blocks, where each pixel block includes a plurality of pixels from the overall image. For example, if the image has dimensions of 1000×1000 pixels, and the number of pixel blocks is determined as 100 (i.e. M=10 rows by N=10 columns), then each pixel block has dimensions 100×100 pixels. During processing, pixel statistics for each pixel block (e.g. based on 10,000 pixels per block) are computed and stored in memory. These statistics are then utilized to compute remapping parameters for each pixel within the image to perform contrast enhancement.

Although remapping pixels based primarily on remapping parameters within each respective pixel block may be effective, utilizing remapping parameters of adjacent pixel blocks may also be beneficial. Thus, in one example, the system utilizes remapping parameters from the pixel block where it is located, and remapping parameters from adjacent pixel blocks in order to remap each pixel. For example, as shown in FIG. 2a, pixel P(x,y) of pixel block b(0,0) may be operated on. In one example, the remapping parameters of pixel block b(0,0) and adjacent pixel blocks b(0,1), b(1,0) and b(1,1) each contribute to remapping pixel P(x,y). The remapping parameters for each of the four pixel blocks may be weighted equally (i.e. equally contributing to remapping), or may be weighted according to the distance between pixel P(x,y) and the respective centers (i.e. c(0,0), c(0,1), c(1,0) and c(1,1)) of the four pixel blocks (i.e. remapping parameters contribute to remapping based on distance to pixel P(x,y)).

In the example shown in FIG. 2a, the remapping parameters of block b(0,0) may be dominant because distance d1 is the shortest of the four distances. Distance statistics of block b(1,1), however may not carry as much weight because distance d4 is the longest of the four distances. In this example, the center pixel of each pixel block is utilized as a reference point relative to each pixel being operated on. However, another point within the pixel block (i.e. other than the center) may alternately be utilized as a reference point. It is also noted that the remapping parameters from any number of pixel blocks (i.e. 1 or more) may be chosen to contribute to remapping each pixel.

If a pixel is located between the centers of two pixel blocks and the border of the image, then remapping parameters of the two pixel blocks may be utilized. Shown in FIG. 2a is an example where pixel P(x,y) is located between blocks b(N−1,0), b(N,0), and the border of the image. In this example, the remapping parameters of blocks b(N−1,0) and b(N,0) may be utilized for remapping.

Figure 2B:
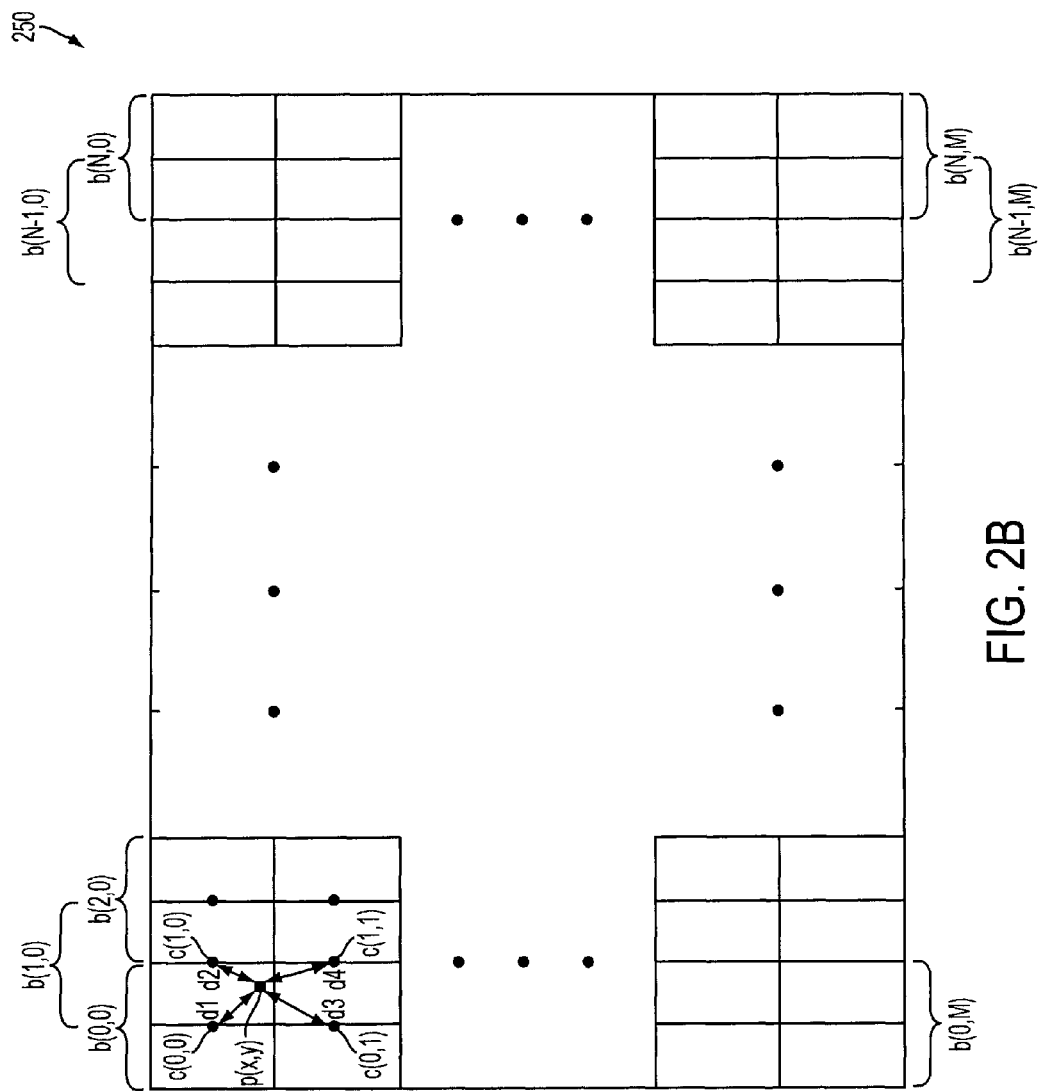
FIG. 2b is a view of another image segmented into a plurality of pixel blocks that overlap each other for performing SVDRA, according to an embodiment of the present invention.

In general, the pixel by pixel remapping operation is performed throughout the entire image until each pixel has an adjusted intensity value resulting in an image with enhanced contrast Although image 200 in FIG. 2a shows that the pixel blocks are spatially independent (i.e. non-overlapping) of one another, they also may overlap each other as shown in FIG. 2b. For example, pixel blocks b(0,0) and b(1,0) are shown to overlap each other by half (e.g. 50 pixels in a 100×100 block) a block. The amount of overlap is not limited to half and may be any number of pixels. Also, even though FIG. 2b shows the columns of pixel blocks being overlapped, it is also noted that the rows of pixel blocks may also overlap. One advantage of overlapping the pixel blocks is that the statistics between adjacent blocks will be somewhat correlated and will not vary as much from block to block (i.e. the statistics of adjacent blocks will be computed based on common pixel values in the overlapping regions). Thus, the statistics may be somewhat correlated between columns, rows or a combination of both. It is also contemplated that pixel blocks may overlap each other in a diagonal direction (not shown) and furthermore that the pixel blocks may be shapes other than squares (not shown).

One embodiment for performing SVDRA is described in the equations below and in the flowcharts of FIGS. 3a and 3b. Some of the parameters of the blocks and the pixels in the image are shown in the table below:

| Name | Symbol | Value |
| --- | --- | --- |
| Input Bit Depth | b | 16 |
| Output Bit Depth | $\tilde{b}$ | 12 |
| Image Width | w | 640 |
| Image Height | h | 480 |
| Block Width | bw | 32 |
| Block Height | bh | 32 |

In general, SVDRA utilizes statistics computed on a block by block basis to define pixel wise remapping parameters. These blocks have dimensions $2^n$ pixel rows and $2^m$ pixel columns. These blocks tile the image starting from the origin and stop when all pixels have been covered by a tile. Also, non-full and non-empty blocks may be allowed to ensure that all pixels in the image with non power of two dimensions are represented.

Figure 3A:
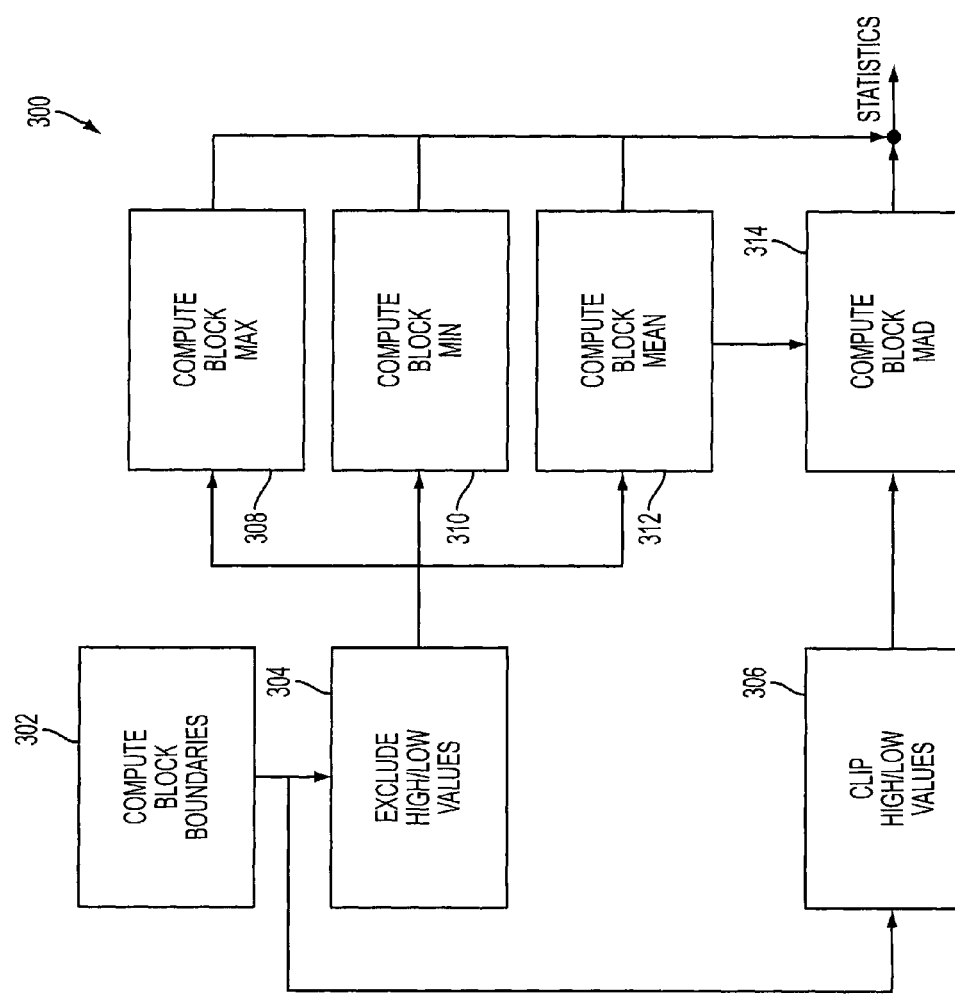
FIG. 3a is a flow chart describing an algorithm for computing block statistics, according to an embodiment of the present invention.

During processing of the pixel blocks, SVDRA computes, independent of the histogram, statistical values for the block mean, the block maximum, the block minimum and the block mean of absolute difference (MAD) (See FIG. 3a). In general, block boundaries (step 302) may be computed in which a pixel $p_{x,y}$ is determined to be a member of the pixels corresponding to the block $b_{i,j}$ when it positively satisfies Equation 2.1.

$$p_{x,y} \in \{b_{i,j}\} \text{ s.t.} \begin{cases} \sum_{r=0}^{i} bw(r) \leq x < \sum_{r=0}^{i+1} bw(r) \\ \sum_{r=0}^{j} bh(r) \leq x < \sum_{r=0}^{j+1} bh(r) \end{cases} \quad (2.1)$$

In general, each block has a local pixel based coordinate system indexed by the horizontal coordinate u and vertical coordinates v. The range of u runs from zero at the left of the block through bw(i)−1, while v similarly runs from zero at the top of the block through bh(j)−1.

Before computing the statistics, SVDRA may exclude high and low pixels values (step 304) from each block. In general, before computing the mean, minimum and maximum of each block, a new set of pixels $\tilde{b}_{i,j}$ is first generated, where $\tilde{b}_{i,j}$ is a population of valid pixels that will number $\delta_{i,j}$. This population size in general is less than or equal to the total number of pixels in the original population $b_{i,j}$ which as a population size $w_{i,j}$.

Figure 4A:
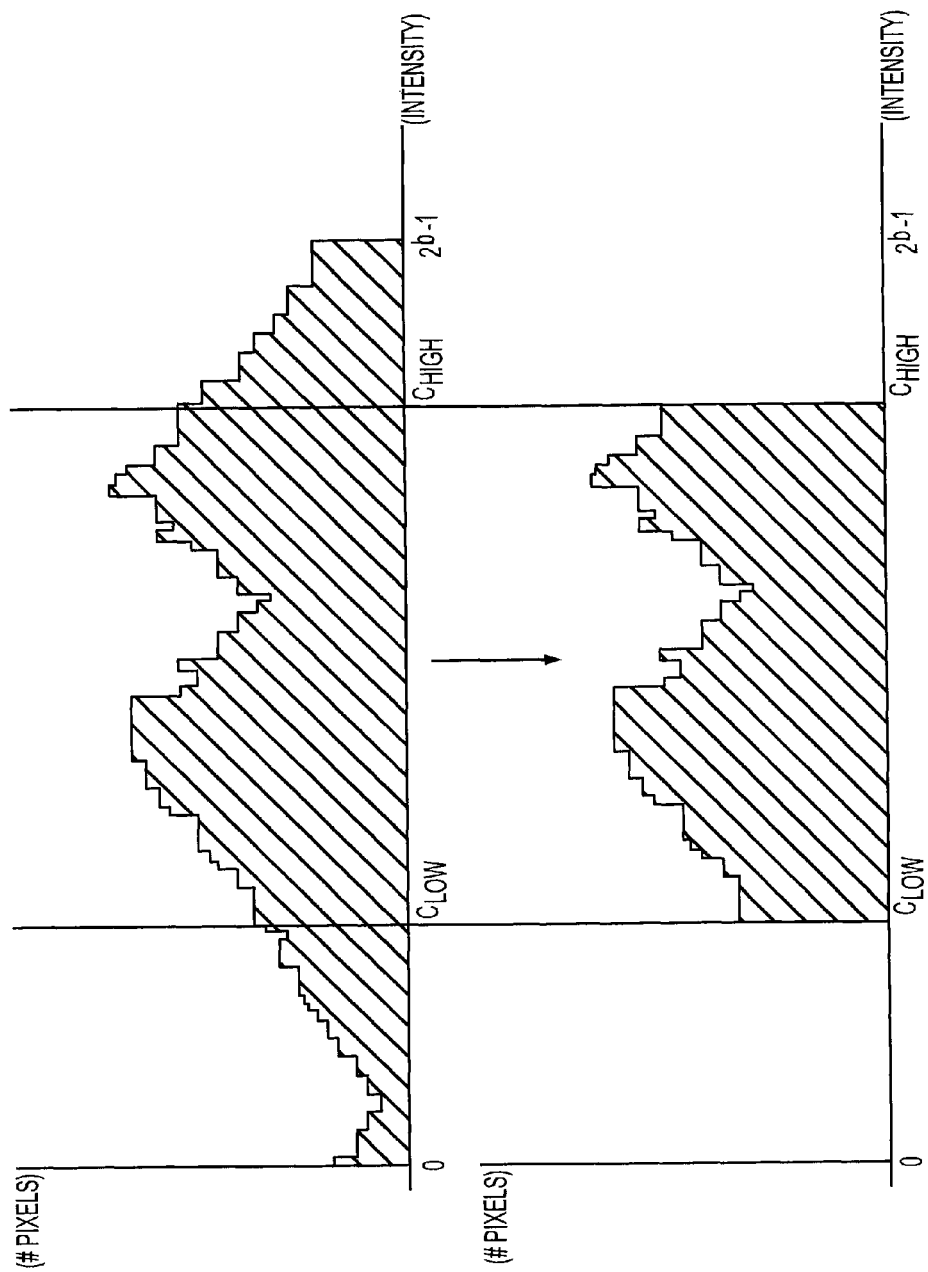
FIG. 4a is a view of a pixel block histogram discarding high and low intensity pixels, according to an embodiment of the present invention.

To form $\tilde{b}_{i,j}$ each pixel in $b_{i,j}$ that is less than the low clip point $c_{low}$, and greater than the high clip point $c_{high}$ is removed from the set. This exclusion process is illustrated in FIG. 4a where the pixel value is less than $c_{low}$ and greater than $c_{high}$ or excluded from the block. This process is applied by the relationship in Equation 2.2:

$$p \in \{\tilde{b}_{i,j}\} \text{ s.t. } c_{low} \leq p \leq c_{high} \cap p \in \{b_{i,j}\} \quad (2.2)$$

In one embodiment, the intensity values of the pixels may be compared to thresholds $c_{low}$ and $c_{high}$ in order to determine if they fall within the appropriate range. If they are greater than or equal to $c_{low}$ or less than or equal to $c_{high}$, they are utilized to compute the block statistics (otherwise they are discarded).

Once the high and low values are excluded, SVDRA computes the block minimum, maximum and mean (steps 308-312). A minimum and a maximum value are found in each set $\tilde{b}_{i,j}$ which are defined by the relationships in equation 2.3 and 2.4:

$$\min_{i,j} = \min(\{\tilde{b}_{i,j}\}) \text{ s.t. } \min_{i,j} \leq p \forall p \in \{\tilde{b}_{i,j}\} \quad (2.3)$$

$$\max_{i,j} = \max(\{\tilde{b}_{i,j}\}) \text{ s.t. } \max_{i,j} \geq p \forall p \in \{\tilde{b}_{i,j}\} \quad (2.4)$$

In some instances, the exclusion operation (step 304) may produce zero pixels. Both non-zero set sizes and zero set sizes are handled as separate conditions. If the number of pixels after exclusion is zero, then equation 2.5 is applied to the value of the minimum, maximum and mean value are set to either $c_{low}$ or $c_{high}$, whichever is exceeded by the last pixel in set $b_{i,j}$.

$$\min_{i,j} = \max_{i,j} = \text{mean}_{i,j} = \begin{cases} c_{low} & \text{if } p_{(bw(i+1)-1, bh(j+1)-1)} \leq c_{low} \\ c_{high} & \text{if } p_{(bw(i+1)-1, bh(j+1)-1)} \geq c_{high} \end{cases} \quad (2.5)$$

In general, the mean of the (i,j)th block is computed as the sum of the elements in $\tilde{b}_{i,j}$ divided by the total number of valid elements, $\epsilon_{i,j}$ as shown in Equation 2.6:

$$\text{mean}_{i,j} = \frac{1}{\epsilon_{i,j}} \sum p \forall p \in \{\tilde{b}_{i,j}\} \quad (2.6)$$

Before computing the Mean of Absolute Differences (MAD) (step 314), the high and low values may be clipped from the block (step 306). For example, a new set of pixel values $\hat{b}_{i,j}$ is first generated from $b_{i,j}$. Rather than dropping pixels from set $b_{i,j}$, the values of the entries are modified (i.e. clamped). The expectation is that the $\hat{b}_{i,j}$ may be the same size as $b_{i,j}$. In general, when clipping high and low values, the values of $b_{i,j}$ are replicated except where a value is less than $c_{low}$ or greater than $c_{high}$. The pixel values less than $c_{low}$ are saturated to the value of $c_{low}$ and the pixel values greater than $c_{high}$ are saturated to the value of $c_{high}$. The value of elements in the set $\hat{b}_{i,j}$ is defined in Equation 2.7:

$$\hat{p} \in \{\tilde{b}_{i,j}\} \; s.t. \hat{p} = \begin{cases} c_{low} & \text{if } p < c_{low} \\ p & \text{if } c_{low} \leq p \leq c_{high} \forall \; p \in b_{i,j} \\ c_{low} & \text{if } p > c_{high} \end{cases} \quad (2.7)$$

Figure 4B:
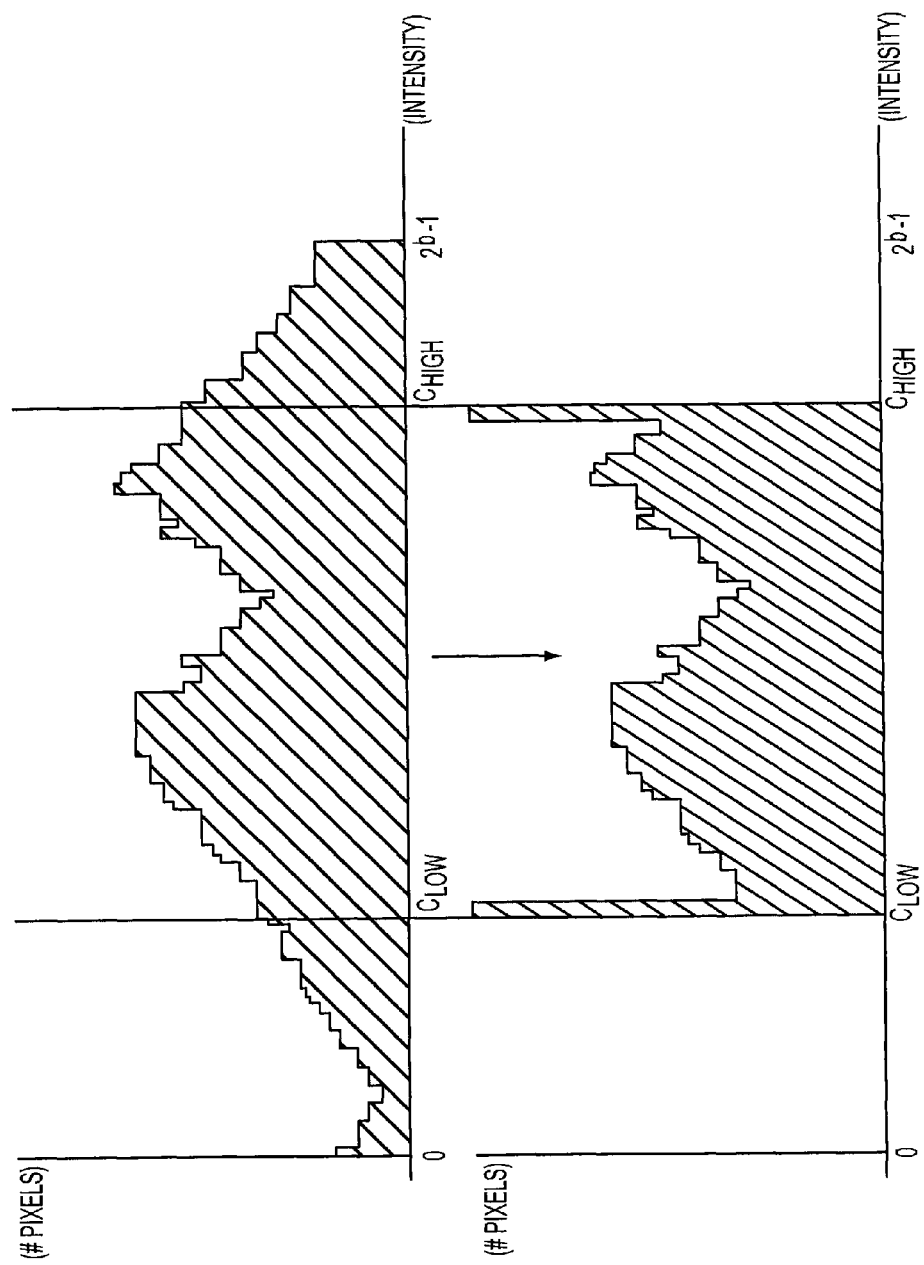
FIG. 4b is a view of a pixel block histogram saturating high and low level intensity pixels to a minimum and maximum intensity value, according to an embodiment of the present invention.

In general, step 306 is illustrated in FIG. 4b where the pixel values less than $c_{low}$ are set at the value of $c_{low}$ and the pixel values greater than $c_{high}$ are set at $c_{high}$.

Once the high and low values are clipped, the MAD statistic is computed (step 314). The MAD is another descriptive statistic which may be preferred over computing the standard deviation for its comparative computational simplicity (i.e. computing the standard deviation requires squaring and square-root operations which may be computationally intensive in some systems). The MAD statistic captures the average magnitude of the differences between the values in a pixel set and the mean of the set. The MAD value may also be properly scaled to keep the values consistent with expectations.

The MAD statistic is computed based on the set of clipped values $\hat{b}_{i,j}$ but uses the block mean which as previously described was computed using the exclusion modified set $\tilde{b}_{i,j}$. The MAD calculation is defined in Equation 2.8 where $w_{i,j}$ is the number of elements in $\hat{b}_{i,j}$. It is noted that in certain instances, if the mean for the pixel block of the current temporal frame is not available, the SVDRA may utilize the value of the pixel block mean of the prior temporal frame in the video sequence.

Figure 3B:
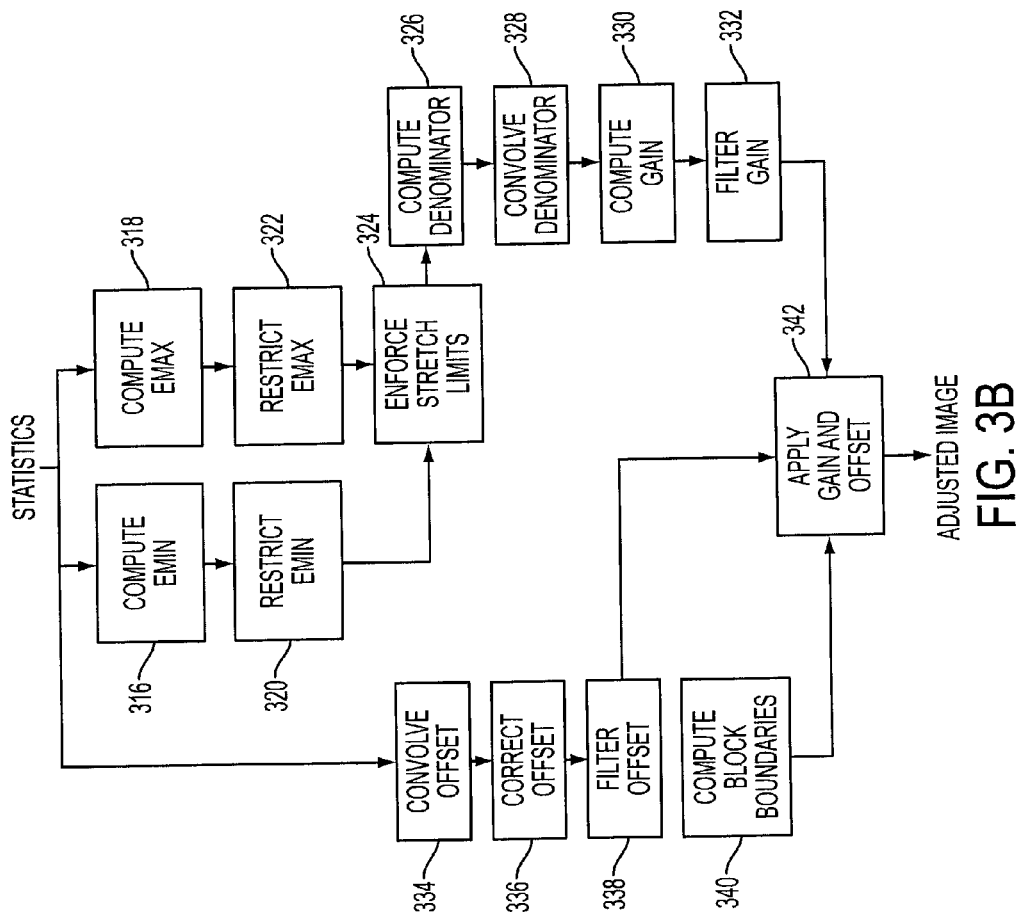
FIG. 3b is a flow chart describing an algorithm for computing block gain and offset, according to an embodiment of the present invention.

Once the basic block statistics (e.g. min, max, mean and MAD) have been computed, SVDRA derives two values $e\_min_{i,j}$ and $e\_max_{i,j}$ for each of the pixel blocks as described in steps 316 and 318 of FIG. 3b. At each pixel block, the MAD and mean value are utilized to compute a preliminary value for $e\_min_{i,j}^{init}$ and $e\_max_{i,j}^{init}$. These values are computed by Equations 3.1 and 3.2 where β is a scaler value:

$$e\_min_{i,j}^{init} = \max(0, mean_{i,j} - \beta(mad_{i,j})) \quad (3.1)$$

$$e\_max_{i,j}^{init} = \min(2^b - 1, mean_{i,j} + \beta(mad_{i,j})) \quad (3.2)$$

In some instances when a pixel block has a skewed distribution $e\_min_{i,j}^{init}$ or $e\_max_{i,j}^{init}$ may exceed the block $min_{i,j}$ or $max_{i,j}$. Thus, SVDRA may restrict the e_min and e_max values (steps 320, 322 and 324) based on the pixel block minimum value and maximum value. If $e\_min_{i,j}^{init}$ or $e\_max_{i,j}^{init}$ is within the extremes of $min_{i,j}$ of $max_{i,j}$, it may not be altered. Otherwise, the average of the extreme and respective $e\_min_{i,j}^{init}$ or $e\_max_{i,j}^{init}$ is used as shown in Equations 3.3 and 3.4 where $n_{low}$ and $n_{high}$ are relative weights for each block:

$$e\_min_{i,j}^{rct} = \quad (3.3)$$
$$\begin{cases} e\_min_{i,j}^{init} & \text{if } e\_min_{i,j}^{init} \geq min_{i,j} \\ ((1-\eta_{low})e\_min_{i,j}^{init}) + ((\eta_{low})min_{i,j}) & \text{if } e\_min_{i,j}^{init} < min_{i,j} \end{cases}$$

$$e\_max_{i,j}^{rct} = \quad (3.4)$$
$$\begin{cases} e\_max_{i,j}^{init} & \text{if } e\_max_{i,j}^{init} \leq max_{i,j} \\ ((1-\eta_{high})e\_max_{i,j}^{init}) + ((\eta_{high})max_{i,j}) & \text{if } e\_max_{i,j}^{init} > max_{i,j} \end{cases}$$

In other cases the difference of $e\_min_{i,j}^{rct}$ and $e\_max_{i,j}^{rct}$ may be small which may cause the SVDRA to over stretch the dynamic range. Thus, the SVDRA may protect against undesirable results by enforcing minimum stretch limits to $e\_min_{i,j}^{rct}$ and $e\_max_{i,j}^{rct}$ so that their difference is at least a minimum stretch limit. This may be accomplished by setting a new value equidistant from the original midpoint between $e\_min_{i,j}^{rct}$ and $e\_max_{i,j}^{rct}$ such that the new value $e\_min_{i,j}^{str}$ and $e\_max_{i,j}^{str}$ differ by λ. This operation is defined in Equations 3.5, 3.6 and 3.7:

$$a_{i,j} = 0.5(e\_max_{i,j}^{rct} + e\_min_{i,j}^{rct}) \quad (3.5)$$

$$e\_min_{i,j}^{str} = a_{i,j} - 0.5(\lambda) \quad (3.6)$$

$$e\_max_{i,j}^{str} = a_{i,j} + 0.5(\lambda) \quad (3.7)$$

In steps 326 and 334, a denominator value and an offset value are respectively computed. Specifically, the gain value (i.e. one of the remapping parameters) that will eventually be used to compute the output pixel values will be the ratio between an output data maximum ($2^b - 1$) and the denominator. The denominator may be related to the range of the input count values to be stretched, and is simply the difference between $e\_max_{i,j}^{str}$ and $e\_min_{i,j}^{str}$ as shown in Equation 3.8:

$$denom_{i,j} = e\_max_{i,j}^{str} - e\_min_{i,j}^{str} \quad (3.8)$$

Furthermore, the offset value that will eventually be utilized to compute the output pixel value will be the mean value of the pixel block after convolution as defined in Equation 3.9:

$$offset_{i,j} = mean_{i,j} \quad (3.9)$$

It is noted that a selected pixel block may have significantly different statistics than a neighboring adjacent pixel block, which may produce undesired artifacts within the image after stretching. Thus, SVDRA performs a smoothing convolution operation (steps 328 and 334) on the computed offset and denominator values. Each offset and denominator value for each respective pixel block is convolved by a convolution kernel to produce convolved values $offset_{i,j}^{conv}$ and $denom_{i,j}^{conv}$. The kernel utilized for involving the offset and denominator values may be implemented as a spatial mask that is scanned across the pixel blocks within the image. For example, the offset and denominator values for a center pixel block (e.g. b(1,1)) may be computed by multiplying kernel values (i.e. normalized weight values) with eight aligned adjacent pixel blocks (e.g. b(0,0), b(0,1), b(0,2), b(1,0), b(1,2), b(2,0), b(2,1) and b(2,2)). In general, by convolving the offset and denominator values for each pixel block, the $offset_{i,j}^{conv}$ and $denom_{i,j}^{conv}$ values will not vary drastically between adjacent blocks.

It is noted that the mean of the offset values prior to and after performing convolution may not be equal. Thus, in one embodiment, the offset value may be corrected for this difference (step 336). Specifically, an offset correction term which is a difference between the means of the pre and post convolution offset values may be computed as defined in Equation 3.10:

$$oc = \text{mean}(\text{offset}_{i,j}) - \text{mean}(\text{offset}_{i,j}^{conv}) \quad (3.10)$$

The correction term oc may then be applied to the offset value by adding it back to the offset convolution values. In this example, the mean of the offset value after correction may equal the mean value of the offset value before convolution as expressed in equation 3.11:

$$k_{i,j} = \text{offset}_{i,j}^{conv} + oc \quad (3.11)$$

In step 330, a gain for each pixel block may also be computed as shown in Equation 3.12:

$$g_{i,j} = (2^{\tilde{b}} - 1)/\text{denom}_{i,j}^{conv} \quad (3.12)$$

Recall that $\tilde{b}$ is the output bit depth, thus $2^{\tilde{b}} - 1$ is the maximum value of the output range. In general, the computed gain may provide a normalization of the data in a domain width $e\_\max_{i,j}^{str} - e\_\min_{i,j}^{str}$ to the output range $(0, 2^{\tilde{b}} - 1)$.

In some video signals, frame to frame variation may be a factor. To compensate for any temporal changes in frame to frame variation, it may be beneficial to filter (steps 338 and 332) the corrected offset value and gain value for each pixel block. For example, in all frames of video, the values $k_{i,j}$ and $g_{i,j}$ may be filtered using an infinite impulse response (IIR) filter controlled by a parameter $\alpha$. The final values $k_{i,j,t}$ and $g_{i,j,t}$ for a frame at time t are defined in Equations 3.16 and 3.17, respectively:

$$k_{i,j,t}^{iir} = \alpha(k_{i,j,t-1}) + (1-\alpha)(k_{i,j,t}) \quad (3.16)$$

$$g_{i,j,t}^{iir} = \alpha(g_{i,j,t-1}) + (1-\alpha)(g_{i,j,t}) \quad (3.17)$$

Once the gain and offset values are filtered, each pixel is adjusted within the image on a pixel by pixel basis (step 342). Unlike the other block wise operations in the flow charts of FIGS. 3a and 3b, step 422 is a pixel wise operation where the computed gain and offset for each pixel block is applied to each individual pixel. For example, given a gain g and offset k a pixel value $p_{x,y}$ is remapped to its output (contrast stretched) value $\tilde{p}_{x,y}$ as described in Equation 3.18:

$$\tilde{p}_{x,y} = g(p_{x,y} - k) + (2^{\tilde{b}-1} - 1). \quad (3.18)$$

In general, the subtraction of the offset value k effectively shifts the mean value of the block to zero. Multiplication by gain value g then stretches the data over a range of $$\pm \frac{2^{\tilde{b}-1}}{2}.$$

The addition of $2^{\tilde{b}-1} - 1$ to the result readjusts the mean of the data to lie at the midpoint of the output dynamic range. This results in block data that has a mean near the midpoint of the output dynamic range and will cover the full output dynamic range $[0(2^{\tilde{b}-1} - 1)]$.

The gain and offset values for each pixel are dependent on the location of the pixel within each block. For example, if a pixel to be stretched is located directly at the center of the pixel block (i.e. at the reference point of the block), then SVDRA algorithm would utilize $g = g_{i,j,t}$ and $k = e\_\min_{i,j,t}$. For all other pixels, however, (not located directly at the pixel block center reference point), SVDRA would form g and k values through an interpolation (e.g. bilinear interpolation) between adjacent pixel blocks (see FIG. 2a). For example, if a pixel $p_{x+\Delta x, y+\Delta y}$ lies interior to four pixel blocks $b_{i,j}$ located at $p_{x,y}$; $b_{i+1,j}$ located at $p_{x+bw,y}$; $b_{i,j+1}$ located at $p_{x,y+bh}$ and $b_{i+1,j+1}$ located at $p_{x+\Delta x, y+\Delta y}$. The gain $g_{x+\Delta x, y+\Delta y}$ to be applied at pixel $p_{x+\Delta x, y+\Delta y}$ is computed using Equation 3.19

$$g_{x+\Delta x, y+\Delta y} = \frac{\Delta y}{bh}\left[\frac{\Delta x}{bw}(g_{i,j}) + \left(1 - \frac{\Delta x}{bw}\right)(g_{i+1,j})\right] + \\ \left(1 - \frac{\Delta y}{bh}\right)\left[\frac{\Delta x}{bw}(g_{i,j+1}) + \left(1 - \frac{\Delta x}{bw}\right)(g_{i+1,j+1})\right] \quad (3.19)$$

Similarly, SVDRA defines the offset $k_{x+\Delta x, y+\Delta y}$ according to Equation 3.20:

$$k_{x+\Delta x, y+\Delta y} = \frac{\Delta y}{bh}\left[\frac{\Delta x}{bw}(k_{i,j,t}) + \left(1 - \frac{\Delta x}{bw}\right)(k_{i+1,j,t})\right] + \\ \left(1 - \frac{\Delta y}{bh}\right)\left[\frac{\Delta x}{bw}(k_{i,j+1,t}) + \left(1 - \frac{\Delta x}{bw}\right)(k_{i+1,j+1,t})\right] \quad (3.20)$$

In another example, a pixel which is bounded by two pixel blocks and the outer edge of the image (See FIG. 2a) is handled by a slight modification to these equations:

$$k_{x+\Delta x, y-bh+\Delta y} = \frac{1}{bw}[\Delta x(k_{i,j,t}) + (1 - \Delta x)(k_{i+1,j,t})] \quad (3.21a)$$

$$k_{x+\Delta x, y+\Delta y} = \frac{1}{bw}[\Delta x(k_{i,j,t}) + (1 - \Delta x)(k_{i+1,j,t})] \quad (3.21b)$$

$$k_{x-bw+\Delta x, y+\Delta y} = \frac{1}{bh}[\Delta y(k_{i,j,t}) + (1 - \Delta y)(k_{i,j+1,t})] \quad (3.21c)$$

$$k_{x+\Delta x, y+\Delta y} = \frac{1}{bh}[\Delta y(k_{i,j,t}) + (1 - \Delta y)(k_{i,j+1,t})] \quad (3.21d)$$

The output pixel $\tilde{p}_{x+\Delta x, y+\Delta y}$ value is then computed using the inte'rpolated gain and offset values as Equation 3.22:

$$\tilde{p}_{x+\Delta x, y+\Delta y} = g_{x+\Delta x, y+\Delta y}(p_{x+\Delta x, y+\Delta y} - k_{x+\Delta x, y+\Delta y}) + (2^{\tilde{b}-1} - 1) \quad (3.22)$$

Although the invention is illustrated and described herein with reference to specific embodiments, the invention is not intended to be limited to the details shown. Rather, various modifications may be made in the details within the scope and range of equivalence of the claims and without departing from the invention.

What is claimed:

1. A system for adjusting dynamic range of an image including a plurality of pixels, comprising:
   a processor configured to:
   a) segment the pixels into blocks,
   b) compute statistical values for each block based on intensity values of the pixels in each block, and
   c) adjust the dynamic range of the image by controlling the intensity values of the pixels based on the statistical values,
   wherein the processor is configured to exclude pixel values in each block before computing the statistical values.

2. The system of claim 1, including
   an image sensor for capturing the image; and
   a display for displaying an adjusted image,
   wherein the processor, image sensor and display are included in Video Capture and Enhancement system (VCED) controlled by a user.

3. The system of claim 1, wherein
   the processor is configured to compute at least one of a minimum pixel value, a maximum pixel value, a mean pixel value and a mean of absolute differences (MAD) value, per each block, as the statistical values.

4. The system of claim 3, wherein
the processor is configured to compute for each block, a gain value based on the mean pixel value and the MAD value of the respective block, and an offset value based on the mean pixel value of the respective block, and
the processor is configured to adjust the dynamic range of the image by applying a respective gain value and a respective offset value to each pixel in each block.

5. The system of claim 1, wherein
the processor is configured to segment the pixels into blocks that overlap each other, or blocks that do not overlap each other.

6. The system of claim 4, wherein
the processor is configured to adjust the gain value and offset value applied to each pixel by weighting the gain value and the offset value based on a distance between each pixel and a reference location in the pixel block to which each pixel belongs and reference locations in adjacent pixel blocks.

7. A system for adjusting dynamic range of a video including a sequence of images, each image including a plurality of pixels, comprising:
a processor configured to:
a) segment the pixels into blocks,
b) compute a gain and an offset value for each block in an image based on intensity values of the pixels in each block,
c) filter the gain and offset values for the blocks based on a previous gain and offset values for the block in a previous image, and
d) adjust the dynamic range of the image by controlling the intensity values of the pixels based on the filtered pixel gain and offset.

8. The system of claim 7, including
an image sensor for capturing real time video; and
a display for displaying an adjusted real time video,
wherein the processor, image sensor and display are included in a vehicle.

9. The system of claim 7, wherein
the processor is configured to compute the gain and offset values for each block in each image based on at least one of a minimum pixel value, a maximum pixel value, a mean pixel value and mean of absolute differences (MAD) value.

10. The system of claim 7, wherein
the processor is configured to filter the gain and offset values by an infinite impulse response (IIR) filter that computes a weighted sum between the gain and the offset values of a block in the image and the previous gain and offset values of the block in the previous image in the sequence.

11. The system of claim 7, wherein
the processor is configured to adjust the gain value and the offset value by weighting the gain value and the offset value based on a distance between each pixel and a reference location in the pixel block to which each pixel belongs and reference locations in adjacent pixel blocks, the processor is configured to select three adjacent blocks when the pixel is located between the centers of four blocks, and
the processor is configured to select one adjacent block when the pixel is located between the centers of two blocks and a border of the image.

12. The system of claim 9, wherein
the processor is configured to convolve the statistical values of each block with a normalized convolution kernel to reduce a difference between statistical values in adjacent blocks.

13. The system of claim 9, wherein
the processor is configured to overlap the blocks in the image to correlate the statistical values between adjacent blocks.

14. A method for adjusting dynamic range of an image including a plurality of pixels, comprising:
segmenting, by a processor, the pixels into blocks;
computing, by the processor, statistical values for each block based on intensity values of the pixels in each block;
adjusting, by the processor, the dynamic range of the image by controlling the intensity values of the pixels based on the statistical values,
computing, for each block, a minimum pixel value, a maximum pixel value, a mean pixel value;
wherein the pixel values below and above an intensity threshold are excluded prior to computing the minimum, the maximum and the mean values; and
computing a mean of absolute differences (MAD) value,
wherein the pixel values below the threshold are set to the minimum value and the pixel values above the threshold are set to the maximum pixel value prior to computing the MAD, and
wherein the minimum the maximum and the MAD values are the statistical values.

15. The method of claim 14, including
capturing, by an image sensor, the image;
displaying, by a display, an adjusted image; and
identifying an object of interest in the adjusted image.

16. The method of claim 14, including
computing a gain value based on the mean pixel value and the MAD value of the respective block,
computing an offset value based on the mean pixel value of the respective block, and
adjusting the dynamic range of the image by applying the respective gain value and the respective offset value to each pixel in each block.

17. The method of claim 16, including
adjusting the gain value and the offset value applied to each pixel by weighting the gain value and the offset value based on a distance between each pixel and a reference location in the pixel block to which each pixel belongs and adjacent pixel blocks.

\* \* \* \* \*